Oct. 15, 1940.                    H. E. GRAY ET AL                    2,217,679
                       APPARATUS FOR PREPARING ARTICHOKES
                   Original Filed April 22, 1935      4 Sheets-Sheet 3

INVENTORS.
Herbert E. Gray.
Arvid M. Erickson.
BY
Chas E. Townsend.
ATTORNEY.

Patented Oct. 15, 1940

2,217,679

UNITED STATES PATENT OFFICE 2,217,679

APPARATUS FOR PREPARING ARTICHOKES

Herbert E. Gray and Arvid M. Erickson, San Jose, Calif., assignors to Barron-Gray Packing Company, San Jose, Calif., a corporation of California Application April 22, 1935, Serial No. 17,671
Renewed September 26, 1936

40 Claims. (Cl. 146—81)

This invention relates to an apparatus for separating the desirable parts of artichokes from the outer leaves and the stem and particularly to improvements over the apparatus shown in Patent Number 1,886,388 issued to George D. Gardner, November 8, 1932.

The artichoke, as known to commerce, is a member of the family *Cynara scolymus*, a plant somewhat resembling a thistle. The edible portions are the flower buds. These are head-shaped and consist of large rough, oval, leaf-like scales enclosing the florets sitting on a broad receptacle which terminates in a stem. The receptacle, together with the fleshy base of the scales, is the edible part of a fully developed bud, but the receptacle, together with the florets and the inner scales, and known as the heart of the artichoke, may be eaten where the buds are young and only partly developed.

The object of the present invention is to provide a machine or apparatus whereby the heart of the artichokes may be quickly separated and removed with relation to the outer scales and the stem, or whereby the receptacle only may be separated and removed with relation to the scales, the florets and the stem.

Other objects of the present invention are to provide a machine which will be capable with minimum adjustments of processing either the partly developed buds or the fully developed buds; to provide a machine or process for simultaneously trimming the leaves and also the florets while the artichoke is held; to provide an automatic artichoke processing machine including a shiftable turret and one or more chucks carried thereby cooperating with cutting and trimming mechanism wherein the chuck and its operating mechanism are constructed and arranged while the turret is at rest to grip and hold an artichoke inserted in the chuck; to provide a machine and process to carry out these and other objects of invention and of the mechanism disclosed and herein claimed.

The machine or apparatus for preparing the artichokes as above described is shown by way of illustration in the accompanying drawings, in which—

In the canning industry two products of artichokes are employed. Where the buds are young and not developed a portion of the receptacles, together with the florets and the inner scales, are cut out and canned. This portion of the artichoke is known as the "heart" and forms one product. Where the buds are fully developed only the receptacle can be used and the method of obtaining and preparing such receptacles is shown in Figs. 4 to 7. The machine of the present disclosure is arranged to produce either product when the receptacles are to be removed and to trim as shown in Figs. 4 to 7 a floret trimming knife is inserted internally of the tubular or cylindrical knife hereinafter referred to. On the other hand, when the hearts of the artichokes are to be cut out, the floret trimming knife is removed; this being the only change required when changing from one product to the other. In order that the two products just described may be obtained, it is more practicable that the artichoke be held by the stem end only. If held in any other way, two different machines are required. In the early part of the season only young buds are obtainable, but later in the season only fully developed buds can be had. If two different machines are required, one machine would necessarily be idle during the first part of the season and the other machine would be idle during the latter half of the season. This is not true in applicants' invention. Young buds or fully developed buds can be handled at any time because it takes only a few minutes to insert or remove the trimming knife referred to.

In the processing of artichokes as herein described, the importance of holding artichokes by the stem end must be emphasized, as it bases certain advantages. For instance, by clamping artichokes around the middle as done heretofore, causes compressing of the leaf-like scales and renders removal of the heart part difficult, which difficulty is entirely eliminated by holding the artichokes by means of the stem. In addition, elimination of the outer scales when the artichoke is held around the middle is a most difficult problem, whereas in applicants' machine the outer layer of scales may be automatically removed in a simple manner. In addition, by providing a chuck and chuck-operating means into which the artichoke is inserted to be held and wherein the means is operable so that the chuck automatically grips and holds the artichoke while the turret carrying the chuck is still at rest, this permits the operator to insert the artichoke, release hold of the same and immediately, with the same hand, grasp another artichoke for a successive feeding operation, while, in the mean time, the turret will have shifted to carry such artichoke to the first processing station and to bring a subsequent chuck to the artichoke in-fitting station, thereby speeding up the process.

Figures 1, 13, 14:
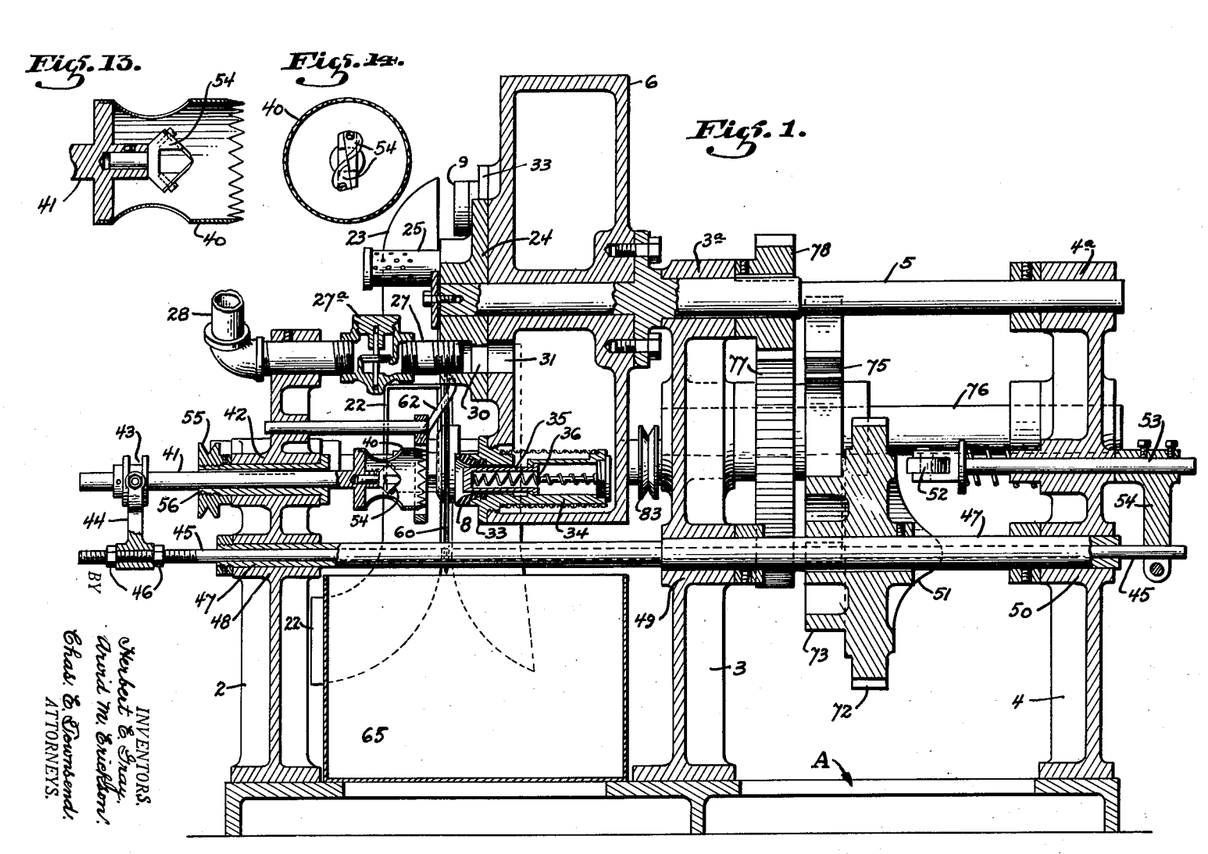
Fig. 1 is a central, vertical, longitudinal section of the machine.
Fig. 13 is a longitudinal section of the tubular knife and said view also showing the trimming plates whereby the florets are removed from the receptacle.
Fig. 14 is an end view of Fig. 13.
Figure 2:
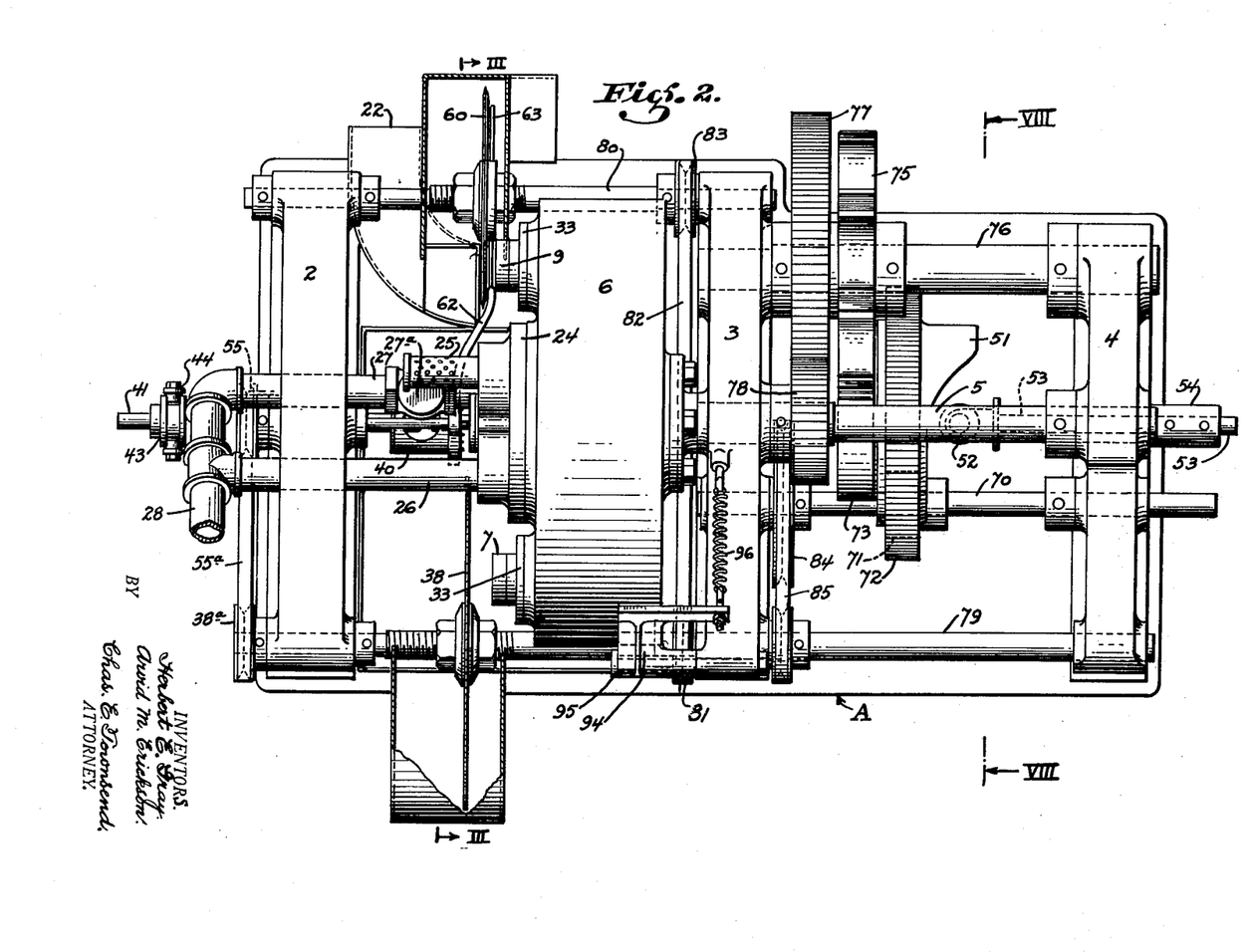
Fig. 2 is a plan view, the guards enclosing the saw and the knife being shown in section.

Referring to the drawings in detail, and particularly Figs. 1 and 2, A indicates a base plate upon which is secured a plurality of transversely disposed vertical frame members 2, 3 and 4. Extending longitudinally of the base and journaled in bearings 3a and 4a carried by the frames 3 and 4 is a shaft 5 on which is secured a drum 6, which carries three suction cups such as indicated at 7, 8 and 9, see Fig. 3. These cups are made of soft rubber and are suction or vacuum actuated as will hereinafter be described.

Figures 3, 4, 5, 6, 7:
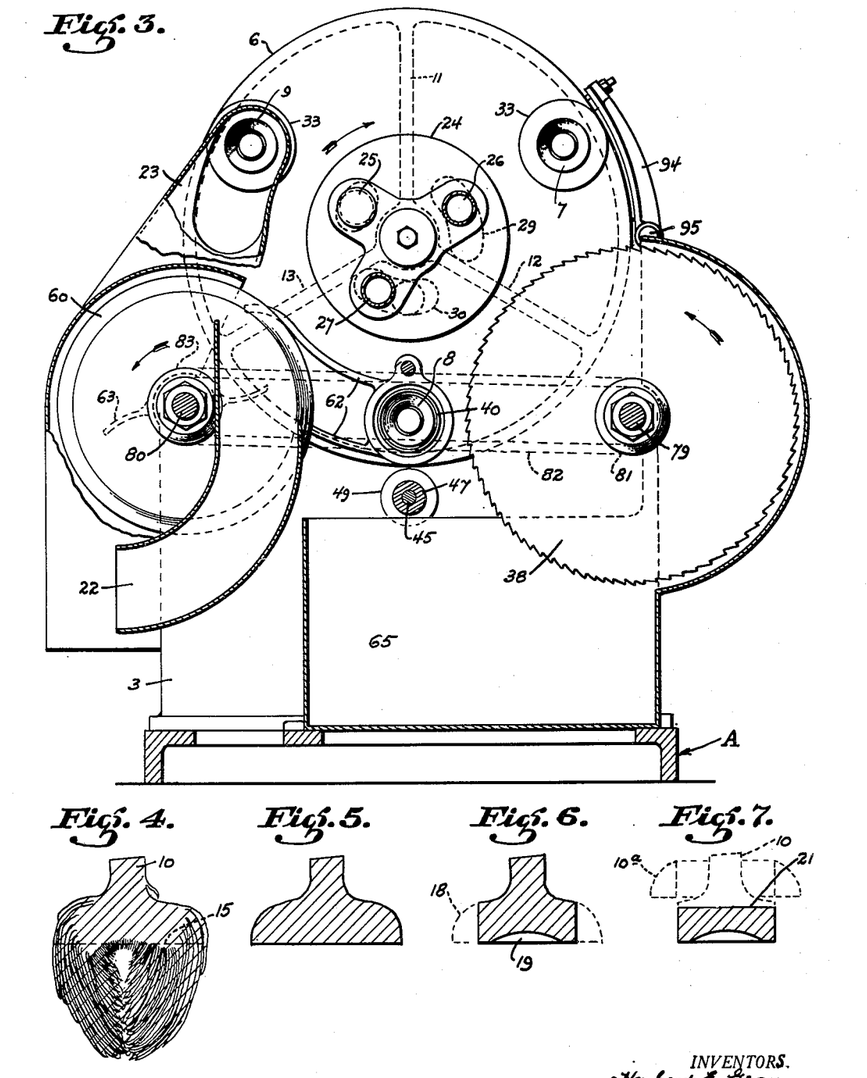
Fig. 3 is a cross section taken on line III—III of Fig. 2.
Fig. 4 shows a half section of a fully developed artichoke.
Fig. 5 is a diagrammatic view showing the first cutting operation.
Fig. 6 is a diagrammatic view showing the trimming of the peripheral edge of the receptacle and the removal of the florets.
Fig. 7 shows the last operation, to-wit, that of separating the receptacle from the stem.

The artichokes to be prepared are fed to these cups by hand, the stem end 10 of the artichoke, see Fig. 4, being inserted in the cup and being there secured by suction action until the vacuum is released. The drum is divided into three compartments by partition walls, such as shown at 11, 12 and 13 in Fig. 3, there being one compartment for each suction cup and there being means provided for creating a vacuum in each compartment during certain cycles of operation and for releasing the vacuum in the successive compartments when the successive operations are completed.

Shaft 5 and the drum secured thereto is intermittently rotated by means of a Geneva movement, each movement being one-third of a revolution followed by a rest period. The artichoke to be prepared is delivered to each cup and automatically held thereby when it is at rest, and when it assumes the position shown in Fig. 3. After an artichoke has been inserted and secured in the cup by suction action, the cup moves past a saw, indicated at 38, which cuts the artichoke on the line 15, see Fig. 4, thereby removing the outer end and leaving the receptacle portion and the stem in the cup. The cup comes to rest when the position 8 is reached, and during this rest period a tubular knife moves toward cup and trims off the outer peripheral edge of the receptacle as shown by dotted lines at 18 in Fig. 6, the outer face of the receptacle, having a few remaining florets adhering thereto, is at the same time trimmed off as indicated by the concave surface 19.

During the next movement the cup moves from the position 8 to that indicated at 9 and as such passes the knife indicated at 60, which cuts the receptacle on the line 21, see Fig. 7. The receptacle is thus separated from the stem and drops as a finished product into a discharge chute 22, while the stem still secured in the cup travels therewith to position 9 where the vacuum is released and the stem is ejected and discharged into a waste chute 23.

Vacuum to hold the artichoke in each cup is maintained from the position 7 until the position 9 is reached. This is accomplished as follows: Engaging the front face of the drum is a head member 24. This head carries a venting pipe 25, see Figs. 2 and 3, and a pair of suction pipes 26 and 27 which are connected to a common suction pipe 28, this pipe being, in turn, connected with a vacuum pump or similar air exhausting device not here shown. The pipe 27 carries a check valve 27a, see Fig. 1, the function of which will hereinafter be described.

Formed in the inner face of the head member 24 are a pair of channels or ducts, such as indicated by dotted lines at 29 and 30, and formed in the face of the drum are three round ports, there being one port for each compartment, one of said ports being shown at 31 in Fig. 1. When the machine is in operation there will be a continuous vacuum or suction action maintained in the pipe 28 and as each compartment of the drum comes in register with the first channel 29 communication with the vacuum or suction pipe 26 will be made and the compartment will be evacuated and there will be a vacuum behind the cup 7. This cup is constructed as follows:

Referring to Fig. 1, it will be noted that the outer end of the cup is made of soft rubber and that it is held by a head member 33, screwed into the face of the drum or otherwise secured. This head member has a cylindrical extension 34 formed therein forming a guide for a plunger 35, which also functions as a stem ejector as will hereinafter be described. A spring 36 is interposed between this plunger and the base of the cylindrical extension 34 and the plunger is thus normally maintained in extended position. It has a loose fit with relation to the cup and the guide passage formed in the head 33 and as this is the case there will be a small flow of air around the plunger and through the cup the moment a chamber comes into register with the pipe 26. It was previously stated that at the point indicated at 7, see Fig. 3, the stem end of the artichoke is inserted in the rubber cup and that as the stem is somewhat cone-shaped where it joins the receptacle part of the artichoke it will fit fairly snugly into the cup and the cup will adhere thereto and substantially all flow of air will cease. The stem end depresses the plunger and it will remain depressed until the vacuum is released.

After the artichoke has been inserted at the point indicated at 7 and when it moves from that position to the position indicated at 8, the saw shown at 38 is passed and the complete outer portion of the artichoke is cut off on the dotted line shown in Fig. 4. Hence, it is merely the receptacle portion and the stem of the artichoke, as shown in Fig. 5, which is left in the cup when it reaches the position shown at 8. The vacuum is maintained as the port 31 will now be in register with the duct 30 formed in the head 24. The only reason that the ducts 29 and 30 are not connected is that there is a considerable inrush of air when an artichoke is being inserted and this inrush might be sufficient to drop the vacuum to the point that an artichoke assuming the position shown at 8 might be released, and it is for this reason that the ducts 29 and 30 are not connected so that insertion of an artichoke at the point 7 will not affect the vacuum in the chamber which is registering with the duct 38 and it is also for the same reason that the check valve 27a has been introduced so that the vacuum of one chamber will not be affected by any increase or decrease in an adjacent chamber.

As previously stated, when the position shown at 8 is reached the drum again comes to a rest, and during the rest period the artichoke is engaged by a tubular knife which trims off the outer peripheral edge shown by dotted lines in Fig. 6, and it is also, during this rest period, that the florets remaining on the receptacle are cut away or trimmed off. The knife for performing this particular operation is best shown in Figs. 13 and 14.

It is tubular in shape, as shown at 40, the outer edge being provided with saw-like teeth to facilitate cutting. The tubular knife is secured to a shaft 41 journaled in a bearing 42. The outer end of the shaft 41 is provided with a grooved collar 43 and this is, in turn, engaged by a fork-shaped member 44 secured on a rod 45, this rod being threaded and provided with nuts 46 so that the fork may be moved in or out on the rod. Such an adjustment is desirable so that the tubular knife 40 may be set in or out as the case may be, that is, the size of the artichokes vary to a certain extent and varying sizes can thus be taken care of. The rod 45 extends through a tubular shaft 47 which is journaled in bearings 48, 49 and 50 carried by the respective frame members 2, 3 and 4. While shaft 47 is subjected to continuous rotation, as will hereinafter be described, rod 45 is never subjected to rotation but is subjected to reciprocal movement at specific time intervals, or to be more specific, to one reciprocal movement during each one-third revolution of the drum and at the time when the drum is at rest. The reciprocal movement is imparted by a cam 51 secured on shaft 47. This cam engages a roller 52 journaled in the outer end of a rod 53, said rod being slidably mounted in the frame 4 and having a bracket 54 secured on its outer end which, in turn, is secured to the rod 45. Shaft 47 makes three revolutions to one revolution of the drum and the cam 51 is so positioned that the reciprocal movement imparted to the rod 45 and the tubular knife takes place during each rest period of the drum. The manner in which shaft 47 is driven will hereinafter be described.

When the tubular knife is pulled inwardly toward the artichoke a circular cut is made and the outer peripheral edge is trimmed and at the same time the florets are removed from the center portion of the receptacle; this being accomplished by a pair of curved blades, as shown at 54, which are secured within the tubular knife in the end of shaft 41. The tubular knife is continuously rotated by a pulley 55, which is secured on a tubular shaft 56, said shaft being splined to the shaft 41 so as to permit reciprocal movement thereof and at the same time permit continuous rotation. Pulley 55 is driven as will hereinafter appear.

After the trimming of the peripheral edge of the receptacle and the removal of the florets which takes place at the position indicated at 8, movement will again be transmitted to the drum and the cup will move from the position shown at 8 to that indicated at 9. During this movement the continuously rotating knife 60 is encountered and the receptacle is cut off, as shown in Fig. 7, thus separated from the stem 10 it drops into a chute 22 as a finished product.

The trimming of the peripheral edge in the position shown at 8 causes the formation of a ring, such as shown by dotted lines at 10a in Figs. 6 and 7. This ring is engaged by a pair of cam arms 62 and the ring is thus pushed toward the face of the drum so as to assume the position shown by dotted lines in Fig. 7. There are a pair of arms 63 on the shaft which carries the knife 60. These arms will engage the ring and knock it to pieces and the pieces will discharge into a waste receptacle or container shown at 65. The knocking off of the ring 10a takes place at the same time the receptacle is severed with relation to the stem. After passing the knife 60 the cup will finally reach the position shown at 9 and at this point the port in the drum, which has maintained a continuous vacuum up to this point, will now register with the vent pipe 5. The vacuum is released and the spring 36 behind the plunger will eject the stem and it will discharge it to the chute shown at 23 and the cycle of operation will be completed, as vacuum will not be applied until the cup moves from the position shown at 9 back to the original position shown at 7.

Figure 8:
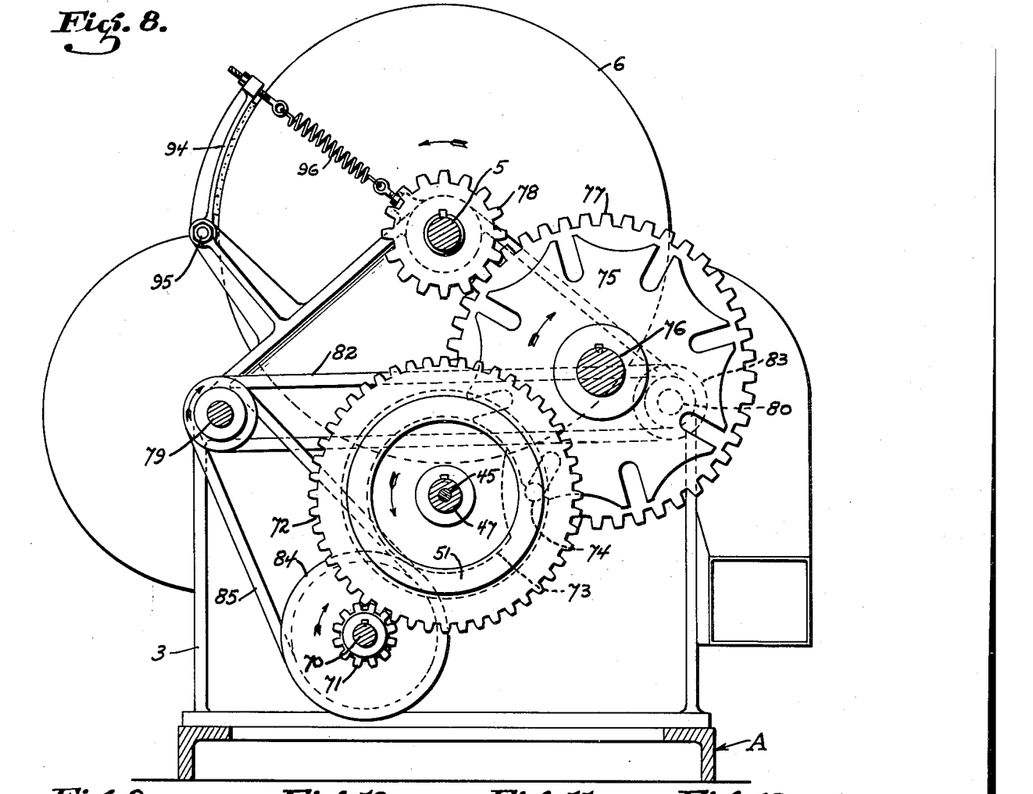
Fig. 8 is a cross section taken on line VIII—VIII of Fig. 2.
Figure 9:
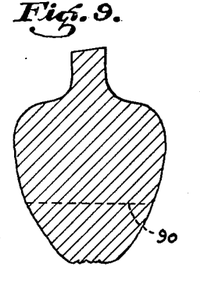
Figs. 9, 10, 11 and 12 are diagrammatic views showing the various operations performed when separating the heart of the artichoke from the outer scales and the stem.
Figure 10:
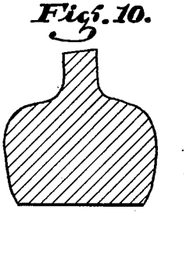
Figure 11:
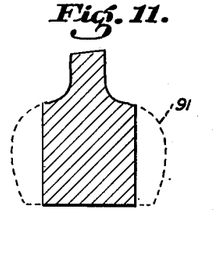

The Geneva drive is best shown in Figs. 1, 2 and 8. The main drive shaft from which power is applied to the machine is indicated at 70. A spur gear pinion 71 is secured to it and meshes with a larger spur gear 72 secured on shaft 47, the gear 72 also carries the cam 51 previously described, that is, the cam is formed on one side face thereof. This gear also forms a drive for the Geneva movement as the opposite face is provided with an annular collar 73 and a driving pin 74. The Geneva gear or the driven member, is indicated at 75. This is, in the present instance, divided into eight slots and cooperating segments and is secured on a shaft 76. This shaft also carries a gear 77 and that gear meshes with a pinion 78 secured on shaft 5. There are two other shafts, the one indicated at 79 and that indicated by dotted lines at 80. The shaft 79 carries the saw 38, see Fig. 2, and it also carries a pulley 38a through which the pulley 55 is driven by means of a belt 55a. The shaft 80 is also driven from shaft 79 by a pulley 81 and a belt 82 which passes over a similar pulley 83 secured on shaft 80; shaft 79 being in turn driven from the main drive shaft 70 by a pulley 84 and belt 85, as clearly shown in Fig. 8.

The shaft 70 is continuously rotated and for this reason continuous rotation of shafts 79 and 80 will be insured. Shaft 47 will also be continuously rotated but the rotation of shafts 76 and 5 will be intermittent due to the Geneva drive interposed between the shafts 76 and 47. Inasmuch as shaft 47 makes three revolutions to one of the drum and the shaft 5, the reduction through the Geneva movement and the gears 77 and 78 will be one to three, and the rest periods will also be one to three or equal to the time required to make one revolution of gear 72.

Figure 12:
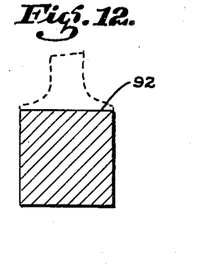

The construction of the machine and the operations performed where the receptacle alone is to be removed from an artichoke has now been described. With the same machine it is also possible to remove the heart portion of the artichoke, this being accomplished by merely removing the trimming knife 54 and adjusting the position of the saw 38; that is, moving it further out on the shaft 79. This shaft is threaded and nuts are applied to opposite sides of the saw 38 so that it may be moved inwardly or outwardly on the shaft as conditions may require. When the heart is to be removed, as shown in Figs. 9 to 12, the saw 38 is spaced further away from the face of the drum so that the first cut will be made along the line indicated at 90, see Fig. 9. During the next operation, the tubular knife 40 will cut away the outer leaves indicated by dotted lines at 91 in Fig. 11; the third operation being that of cutting the heart away from the stem along the line 92 by means of the knife 60 as shown in Fig. 12. Most of the waste produced is caught by the receptacle shown at 65, see Figs. 1 and 3. The finished product is in each instance discharged into the chute 22 and the stems are discharged into the chute shown at 23. These chutes and receptacles may, of course, be otherwise arranged as conditions may demand and while other features of the machine are more or less specifically described and illustrated, we wish it understood that various changes may be resorted to within the scope of the appended claims. Similarly, that the materials and finish of the several parts employed may be such as the manufacturer may decide, or varying conditions or uses may demand.

By referring to Figs. 2 and 8 it will be noted that a brake shoe 94 engages the outer peripheral surface of the drum 6. This shoe is pivoted at 95. The opposite end of the shoe is connected to a spring 96. This spring maintains a constant pull on the brake shoe and the shoe as such will exert constant frictional resistance against rotation of the drum. This frictional resistance has been provided for the purpose of taking up any lost play in the Geneva movement, or in other words, over-running of the drum and to bring it to an instant stop when the Geneva drive releases it.

Having thus described our invention, what we claim and desire to secure by Letters Patent is:

1. In an apparatus for the purpose described, means for receiving and holding the stem end of an artichoke, means for cutting off the outer end of the artichoke, a rotating knife movable toward the outer cut off end of the artichoke to make a central substantially cylindrical cut to separate the outer leaves from the central heart portion of the artichoke, and means for cutting off the heart portion to release it with relation to the stem.

2. In an apparatus for the purpose described, means for receiving and holding the stem end of an artichoke, means for cutting off the artichoke in substantial alignment with the outer end of the receptacle of the artichoke, means for cutting off the outer annular edge of the receptacle and simultaneously cutting away the florets adhering to the receptatcle, and means for cutting off the receptacle to release it with relation to the stem.

3. In an apparatus for the purpose described, a movable member for receiving and holding the stem end of an artichoke, means in the path of the movable member for cutting off the artichoke in substantial alignment with the outer end of the receptacle portion of the artichoke, a pair of knives movable toward the cut off end of the artichoke for simultaneously cutting off the outer annular edge of the receptacle, and for cutting away the florets adhering to the central region of the receptacle, the knife for cutting of the annular edge being tubular and the knife for cutting away the florets consisting of radial blades positioned centrally of the tube and adjacent the inner end thereof and means in the path of the movable member for cutting off the receptacle at a point adjacent the stem to release it with relation to the stem.

4. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement of the drum, means for moving a knife toward the cut off end of the artichoke to make a central substantially cylindrical cut to separate the outer leaves from the central heart portion of the artichoke during a second rest period, and means for cutting off the heart portion to separate it from the stem during a second period of movement.

5. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement of the drum, means for moving a knife toward the cut off end of the artichoke to make a central substantially cylindrical cut to separate the outer leaves from the central heart portion of the artichoke during a second rest period, means for cutting off the heart portion to separate it from the stem during a second period of movement, and means for ejecting the stem from the cup during a third period of rest.

6. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement of the drum, means for moving a knife toward the cut off end of the artichoke to make a central substantially cylindrical cut to separate the outer leaves from the central heart portion of the artichoke during a second rest period, means for cutting off the heart portion to separate it from the stem during a second period of movement, and means for maintaining a partial vacuum in the cup until the third rest period is reached.

7. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement, a tubular knife movable toward the cut off end of the artichoke during a second rest period to make a central substantially cylindrical cut to separate the outer leaves from the central heart portion of the artichoke, and means for cutting off the heart portion at a point adjacent the stem to separate it from the stem during a second period of movement.

8. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement, a tubular shaped knife movable toward the cut off end of the artichoke during a second rest period to make a central cylindrical cut to separate the outer leaves with relation to the receptacle portion of the artichoke, a second knife mounted within the tubular knife for simultaneously cutting away florets adhering to the outer face of the receptacle, and means for cutting off the receptacle portion of the artichoke at a point adjacent the stem to separate it from the stem, said cutting off taking place during a second period of movement.

9. In an apparatus for the purpose described, a drum, a suction cup carried by the drum to receive and secure the stem end of an artichoke, means for intermittently rotating the drum a partial revolution and for maintaining a rest period between each partial revolution, said stem end of the artichoke being inserted in the cup during a first rest period, means for cutting off the outer end of the artichoke during a first period of movement, a tubular shaped knife movable toward the cut off end of the artichoke during a second rest period to make a central cylindrical cut to separate the outer leaves with relation to the receptacle portion of the artichoke, a second knife mounted within the tubular knife for simultaneously cutting away florets adhering to the outer face of the receptacle, means for cutting off the receptacle portion of the artichoke at a point adjacent the stem to separate it from the stem, said cutting off taking place during a second period of movement, and means for ejecting the stem from the cup during a third period of rest.

10. In a machine of the character described, a drum divided into a plurality of compartments, means for successively establishing a vacuum and for releasing the vacuum in the respective compartments, a suction cup connected with each compartment and adapted to receive the stem end of an artichoke to secure the artichoke with relation to the drum, a spring actuated plunger centrally positioned with relation to each cup and extending into the same, said plunger adapted to be depressed by the stem of the artichoke when the artichoke is inserted, means for imparting a step by step rotary movement to the drum and for maintaining a rest period between each step by step movement, and means cooperating with the drum for cutting the artichoke to separate the receptacle portion thereof with relation to the leaves in the stem of the artichoke.

11. In a machine of the character described, a drum divided into a plurality of compartments, means for successively establishing a vacuum and for releasing the vacuum in the respective compartments, a suction cup connected with each compartment and adapted to receive the stem end of an artichoke to secure the artichoke with relation to the drum, a spring actuated plunger centrally positioned with relation to each cup and extending into the same, said plunger adapted to be depressed by the stem of the artichoke when the artichoke is inserted, means for imparting a step by step rotary movement to the drum and for maintaining a rest period between each step by step movement, and means cooperating with the drum for separating the heart portion of the artichoke with relation to the outer leaves and the stem.

12. In a machine of the character described a member for receiving and securing the stem end of an artichoke, said member being movable past a saw to cut off the outer end of the artichoke on a line just forward of the receptacle portion of the artichoke, a tubular knife movable toward the cut off end of the artichoke to trim off the outer edge of the receptacle, said tubular knife carrying a second knife consisting of blades radiating from the center of the tube and positioned adjacent the inner end thereof whereby florets adhering to the outer face of the receptacle are simultaneously trimmed off, and a knife for cutting off the receptacle at a point between the stem and the receptacle.

13. In an apparatus of the class described, means for receiving and clamping an artichoke at its stem end, tubular cutting means co-axial of said holding means, means to produce relative axial movement between said holding means and cutting means to produce an axial incision around the heart of an artichoke, and means associated therewith to trim away the central florets coincidentally with the step of cutting the heart.

14. An artichoke trimming machine comprising means for holding an artichoke by its stem, means for advancing said holding means in a direction normal to the axis of said stem, a knife positioned in a plane parallel to the plane of movement of the artichoke to cut transversely through the same, a cutter rotating about an axis normal to said plane of movement, means for moving said cutter axially toward the artichoke to cause it to trim the same circumferentially, and a second knife positioned in a plane parallel to that of the first knife and closer to the stem of the artichoke, said second knife cutting a slice from the trimmed butt.

15. An artichoke trimming machine comprising means for holding an artichoke by its stem, means for advancing said holding means in a direction normal to the axis of said stem, a knife positioned in a plane parallel to the plane of movement of the artichoke to cut transversely through the same, a cutter rotating about an axis normal to said plane of movement, said cutter being positioned to trim the butt of the artichoke circumferentially, a second rotating cutter positioned to trim the end face of said butt, and a second knife positioned in a plane parallel to that of the first knife and closer to the stem of the artichoke, said second knife cutting a slice from the trimmed butt.

16. An artichoke trimming machine comprising means for holding an artichoke by its stem portion, means for transversely cutting the leaves therefrom approximately in the plane of the outer end of the solid portion of the butt while the artichoke is thus held, means for circumferentially trimming the butt and for removing the fibrous material from the central hollow portion of said butt of the thus held artichoke, and means for making a second transverse cut through the butt in a plane closer to the stem than the first mentioned cut while the artichoke is thus held.

17. An artichoke trimming machine comprising means for holding an artichoke by its stem portion, means for transversely cutting the leaves therefrom approximately in the plane of the outer end of the solid portion of the butt, means for circumferentially trimming the butt, means for removing the fibrous material from the hollow of said butt, means for making a second transverse cut through said butt in a plane closer to the stem than the first mentioned cut, and mechanism for moving said holding means to present the artichoke successively to said cutting and trimming means.

18. An artichoke trimming machine comprising a rotatable turret, a plurality of artichoke holding means carried thereby, means for transversely cutting the leaves from the artichokes in said holding means, means for circumferentially trimming the butts of said artichokes, means for trimming the outer cut ends of said butts, means for transversely cutting through the trimmed butts, and means for rotating the turret to present the artichokes to said cutting and trimming means.

19. An artichoke trimming machine comprising a turret, a chuck carried by said turret for gripping the stem of an artichoke, means for transversely cutting the leaves from the artichoke held by said chuck, means for trimming the butt of said artichoke, means for transversely cutting through the trimmed butt, and means for rotating said turret to present the artichoke to said cutting and trimming means.

20. An artichoke trimming machine comprising a turret, a chuck carried by said turret for gripping the stem of an artichoke, means for transversely cutting the leaves from the artichoke held by said chuck, means for trimming the butt of said artichoke, means for transversely cutting through the trimmed butt, and means for intermittently rotating said turret, said chuck including means to grip the stem of said artichoke and hold it before the turret starts to move.

21. An artichoke trimming machine comprising means for holding an artichoke, means for cutting transversely through the leaves of the artichoke, a rotating cylindrical cutter positioned to trim the bases of the leaves circumferentially from the butt of the artichoke, and a knife mounted within said cutter to trim the end of said butt.

22. An artichoke trimming machine comprising means for holding an artichoke, means for cutting transversely through the leaves of the artichoke, a rotating cylindrical cutter positioned to trim the bases of the leaves circumferentially from the butt of the artichoke, and a curved knife mounted within said cutter and positioned to scoop out the fibrous material from the hollow of said butt.

23. The method of processing artichokes comprising holding the artichoke by its stem while cutting across said artichoke substantially transversely of its stem axis to remove leafy and fibrous portions, thereafter forming a circular cut in a direction substantially at right angles to the first mentioned cut to remove the remainder of the leafy portion and a slight portion of the solid part of the butt, and thereafter severing the thus trimmed artichoke from its held stem.

24. The method of trimming artichokes comprising holding the artichoke by its stem end only, the leafy portion being free, cutting through the leaves thereof substantially transversely of the axis of the stem approximately in the plane of the outer end of the solid portion of the butt while so held, forming a circumferential cut through the held butt in a direction substantially parallel with the stem axis for removing the basal portions of the outer leaves at the butt, and forming a second substantially transverse cut through said butt while the artichoke is still held by its stem, said last mentioned cut being formed in a plane closer to the stem than the first mentioned cut.

25. An artichoke trimming machine comprising a support, a turret mounted on said support, means for intermittently rotating said turret, a plurality of artichoke chucks mounted on said turret, each chuck including means for holding an artichoke by its stem, means associated with said turret and said chucks thereon for severing the outer leafy portions of each artichoke while held in a chuck by its stem, said means effecting a cut on an artichoke substantially transversely of its stem axis, means associated with said turret for thereafter forming a circular cut through the leafy portion of each artichoke in a direction substantially transversely to the first mentioned cut, means associated with said turret for severing the thus trimmed artichoke from its stem during the movement of said turret, and a trimmed artichoke receiving means associated with said last severing means for automatically receiving and delivering the severed trimmed artichoke portion to a predetermined point, leaving the stem portion of the artichoke in the moving chuck on the turret.

26. In an artichoke trimming machine comprising a base, a turret on said base, a plurality of chucks on said turret, each adapted to hold an artichoke by its stem, means for forming a transverse cut through the outer leafy portion of an artichoke, means for forming a circular cut in a direction parallel to the stem axis through the butt portion of the artichoke whereby to remove a ring-shaped portion of the base of the butt of the artichoke, means for laterally displacing said ring from the unsevered base of the artichoke while said artichoke is still held by its stem in said chuck, means for breaking the severed ring to discharge it from a chuck, and means for forming a second transverse cut through the trimmed portion of the artichoke to sever it from the held stem.

27. In an artichoke trimming machine, the combination of a support, a rotary turret thereon including means automatically to hold an artichoke by its stem, means for automatically releasing each artichoke stem from its holding means at a predetermined angular position of the turret, means for trimming an artichoke, including means for severing the trimmed portion from the stem, a chute positioned automatically to receive the trimmed artichoke portion during the movement of the turret and to convey said trimmed portion to a predetermined point of discharge, and a second retaining chute associated with said turret and adapted automatically to receive the stem when discharged from a chuck and to convey said stem to a second point of discharge.

28. In a device of the class described, the combination of a support, an intermittently rotating turret thereon, a plurality of chucks on said turret, each chuck including an impervious flexible cup adapted to receive the butt end and stem of an artichoke, a plunger disposed in the central portion of each cup, resilient means for normally extending said plunger outwardly in a direction tending to eject the stem of the artichoke from the cup, and means for normally holding said artichoke in said cup, including means for releasing said holding means to permit ejection of the stem from said cup.

29. A trimming device for an artichoke machine comprising a cylindrical cutter having a central axis about which is adapted to be rotated, the circular edge of the cutter being provided with cutting teeth, and a cutting blade mounted within the cylindrical cutter substantially to the rear of said circular cutting edge and adapted upon rotation of the cutter to trim the central portion of the butt of the artichoke while the edge of the rotating cylinder is simultaneously forming a concentric cut thereabout and substantially in advance of the cut formed by the internally mounted blade.

30. A trimming device for artichokes comprising a cylindrical body having a central axis by which said body may be rotated, the opposite circular end of said body being provided with cutting teeth, the circular wall of said body being provided with an enlarged discharge opening, and a second trimming means mounted within said circular body substantially opposite said opening for forming a circular cut concentrically within the cut formed by the edge teeth of the rotating body, the trimmed products formed by said circular cut being adapted to discharge through the wall opening in the cylindrical body.

31. In an artichoke trimming machine, the combination of a support, a chuck mounted on said support adapted to hold an artichoke by its stem and basal portion of the butt, circular cutting means rotatable about an axis substantially concentric with the stem axis of the artichoke for severing a ring-shaped section through the leaves and basal portion of the butt of the artichoke while so held, means operating concentrically within said circular cutting means for forming a central, circular depression in the outer face of the butt portion of the artichoke, and means for discharging the trimmings from this last cut portion in a direction laterally of the stem axis of the artichoke and while said artichoke is held in said holding means.

32. The method of processing artichokes comprising holding the artichoke by its stem while cutting across said artichoke substantially transversely of its stem axis to remove leafy and fibrous portions, thereafter forming a circular cut in a direction substantially at right angles to the first mentioned cut to remove the remainder of the leafy portion and thereafter severing the thus trimmed artichoke from its held stem.

33. An artichoke trimming machine comprising means for holding an artichoke, means for cutting transversely through the leaves of the artichoke, leaving a basal butt section having circumferential leaves attached thereto, and a leave and floret trimming rotatable cutter cylindrical in formation and having its circular edge sharpened and cutting means mounted within said cylindrical cutter substantially to the rear of said circular cutting edge for cutting a portion of the butt of said artichoke, the side wall of said cutter having a relatively large opening substantially opposite said internal cutter for discharging therethrough cuttings formed by said internal cutter and means for producing motion between said artichoke and said cylindrical cutter, including means for rotating said cylindrical cutter, whereby to cause said cylindrical cutter and said internal cutter to move relatively to said artichoke in a direction parallel to the stem axis of the cutter, the sharpened edge of the cylindrical cutter moving entirely across the artichoke to remove the circular leaves, and the internal cutter trimming the florets simultaneously therewith.

34. An artichoke trimming machine comprising means for holding an artichoke, means for cutting transversely of the stem axis of the artichoke to cut through the leaves of the artichoke and a rotating cutter, having its circular edge formed as a cutter, and means for producing relative movement between the artichoke and the cutter in a direction parallel to the stem axis of the artichoke, while rotating said cutter whereby to form a circular line of cut parallel to and concentric to the stem axis of the artichoke whereby to sever the bases of the leaves circumferentially from the butt of the artichoke, and means mounted concentrically within the line of cut formed by said cutter and substantially to the rear of the forward cutting edge of the cutter and rotatable with said cutter for trimming the butt of the artichoke.

35. An artichoke trimming machine comprising a turret, a chuck carried by said turret for holding an artichoke, means for trimming said artichoke, means for intermittently rotating said turret to carry the artichoke from a loading station to said trimming means, means operated by the rotary movement of the turret for disabling said chuck to permit the discharge of the artichoke therefrom, and means controlled in timed relation with the movements of the turret and automatically operable while the chuck is at the loading station and before the turret starts to move for rendering the chuck operative to grip the artichoke.

36. An artichoke trimming machine comprising means for holding an artichoke, means for cutting transversely through the leaves of the artichoke while the artichoke is held by said holding means, and a rotating cylindrical cutter positioned to trim the bases of the leaves circumferentially from the butt of the artichoke while the artichoke is held by said holding means, said holding means being operable to grip artichoke portions disposed internally of the cutting plane of said cylindrical cutter.

37. An artichoke trimming machine comprising means for holding an artichoke, means for cutting transversely through the leaves of the artichoke while the artichoke is held by the holding means, and a rotating cylindrical cutter movable parallel to the stem axis of the artichoke axially toward and away from and completely through the body of the artichoke to trim the same of the leaves which extend circumferentially from the butt of the artichoke, said cylindrical cutter being operable upon the artichoke while the artichoke is held by the holding means and said holding means being operable to grip artichoke portions disposed internally of the cutting plane of said cylindrical cutter.

38. A trimming device for an artichoke trimming machine comprising a rotatable, cylindrical cutter having its circular edge formed as a cutter, and cutting means mounted within said cylindrical cutter for cutting the cup-shaped portion of the butt of an artichoke, the side wall of said cutter having a large opening substantially opposite said internal cutter for discharging therethrough the cuttings formed by said internal cutter.

39. An artichoke trimming machine comprising a turret, a chuck carried by said turret for gripping an artichoke, means for transversely cutting the leaves of the artichoke, means for trimming the leaves of the artichoke, means for transversely cutting through the butt of the artichoke, and means for rotating the turret to present the artichoke successively to said leaf-cutting leaf-trimming and butt-cutting means while the artichoke is held by said chuck, said chuck being operable to grip only the artichoke stem and adjacent artichoke areas.

40. An artichoke trimming machine comprising a turret having spaced artichoke gripping chucks, means for intermittently rotating the turret to move the chucks successively from a feeding station to an operating station, mechanism for actuating said chucks to render the same operative to grip an artichoke or inoperative to release the same, cutting means associated with said turret and adapted to operate upon an artichoke while held in a chuck at said operating station, and means associated with the chuck including mechanism controlled in timed relation with the movements of the turret and automatically operable while the chuck is at rest at the feeding station and before the turret starts to move to render a chuck at the feeding station operative to grip and hold an artichoke.

HERBERT E. GRAY.
ARVID M. ERICKSON.